United States Patent Office 3,792,097
Patented Feb. 12, 1974

3,792,097
PROCESS FOR THE PREPARATION OF DIMETHYLDECALINS
Keizo Shimada, Takeo Nishikawa, Toshiaki Harada, and Shizuo Nagahama, Tokyo, Japan, assignors to Teijin Limited, Osaka, Japan
No Drawing. Filed Oct. 25, 1972, Ser. No. 300,808
Claims priority, application Japan, Nov. 2, 1971, 46/86,783; Nov. 8, 1971, 46/88,843
Int. Cl. C07c 3/56, 5/28
U.S. Cl. 260—666 PY    5 Claims

ABSTRACT OF THE DISCLOSURE

In the process for the preparation of dimethyldecalins by catalytically reacting Decalin with ethylene in the presence of a Friedel-Crafts catalyst, the improvement which comprises operating the process in two steps:

(a) A catalytic alkylation reaction of cis-Decalin with ethylene at a temperature ranging between −50° and 50° C., and subsequently
(b) An isomerization reaction of the resulting product system at a temperature ranging between −20° and 80° C. in the presence of a Friedel-Crafts catalyst but absence of ethylene.

This invention relates to a process for the preparation of dimethyldecalins commercially advantageously at excellent selectivity and yield from Decalin and ethylene.

The present invention relates to an advantageous process for preparing the dimethyldecalins which can be utilized for the preparation of the dimethylnaphthalene, a useful starting material for the preparation of the polyesters. However, the preparation of dimethyldecalin from Decalin and ethylene has not been put to practice on a commercial scale in the past.

U.S. Pat. 3,509,223 to Bushick et al. (corresponding patents: British Pat. 1,222,034, French Pat. 2,013,344 and German Pat. 1,927,374) discloses a commercial process for the preparation of dimethyldecalins, which comprises the transformation of cyclohexane into dimethyldecalins by means of an acid catalyst. The selectivity in accordance with this process is at most of the order of 50% and, in addition, the amount of by-products is exceedingly great. Hence, there is much room for improvement of such disadvantages before this process can be practiced on a commercial scale.

On the other hand, there is a report by J. R. Dice and D. R. McKinney in the J. Am. Chem. Soc., vol. 72, pp. 1403–1404 concerning the alkylation of Decalin by reacting Decalin and ethylene in the presence of a Friedel-Crafts catalyst. In this report it is disclosed that the alkylation of Decalin was carried out by reacting 276.5 grams of Decalin with 28.0 grams of ethylene for 7.5 hours. This report makes no mention whatsoever of the formation of dimethyldecalin. However, in view of the boiling point of the product fraction, of the portion mentioned as "Residue" in this report amounting to 5.8 grams, a small portion thereof might have been occupied by dimethyldecalin. Now, even supposing the total amount was dimethyldecalin, the yield from the starting Decalin would be an extremely low yield and of no practical use.

In consequence of our investigations into the commercial preparation of dimethyldecalins, we found that in the reaction of Decalin with ethylene catalyzed by a Friedel-Crafts catalyst, of the Decalin having the two classes of isomers, i.e. the cis and trans forms, the cis-Decalin would be transformed into ethylated Decalin at high selectivity at a temperature less than 50° C., and particularly less than 45° C., and further that the selectivity for ethylated Decalin would suffer greatly if the reaction is carried out at temperatures exceeding the foregoing temperatures. It was further found that conversion to ethylated Decalin would not take place to an appreciable extent in the case of the trans-Decalin.

That cis-Decalin alone could be transformed into ethylated Decalin at high selectivity, that this conversion takes place well at less than 50° C. and that the selectivity for ethylated Decalin would become extremely poor at temperatures exceeding 50° C. were not known at all heretofore.

In consequence of having furthered our researches, we found that dimethyldecalins could be prepared at excellent selectivity and yield and an excellent commercial process for the preparation of dimethyldecalins could be provided by carrying out the catalytic alkylation reaction of cis-Decalin and ethylene at a temperature in the range of −50° to 50° C. and thereafter carrying out the isomerization reaction at a temperature of −20° to 80° C. in the presence of the same Friedel-Crafts catalyst as that used in the foregoing catalytic alkylation reaction or another Friedel-Crafts catalyst, but absence of ethylene.

It is therefore an object of the present invention to provide a commercially employable practical process for the preparation of dimethyldecalins. Another object is to provide a vastly superior commercial process for the preparation of dimethyldecalins by the utilization of the alkylation reaction of Decalin wherein the reaction of Decalin and ethylene is carried out in the presence of a Friedel-Crafts catalyst, which has not been used at all hitherto in the preparation of dimethyldecalins.

Other objects and advantages of the invention will become apparent from the following description.

The starting cis-Decalin used in the present invention may be cis-Decalin alone or a mixture of cis- and trans-Decalins. The starting material preferably used is one which contains at least 10% by weight of cis-Decalin. The Decalins can be prepared in various ways. For instance, they can be obtained by the hydrogenation of the inexpensive, readily available naphthalene in the presence of a hydrogenation catalyst such, for example, as platinum, palladium, nickel, iridium, ruthenium and rhodium. The Decalin obtained in this case will differ in the proportion in which the cis and trans forms are formed depending upon the class of the hydrogenation catalyst used.

For instance, when a hydrogenation catalyst such as iridium and ruthenium is used, a Decalin containing above 95% of the cis form can be obtained. On the other hand, when the ordinary nickel catalyst is used, a Decalin containing 20–50% of the cis form is obtained.

The boiling point of trans-Decalin is 185.1° C. and that of cis-Decalin is 193° C. Hence, a Decalin containing the cis-Decalin in the desired concentration can be obtained by distillation of a mixture of the cis- and trans-Decalins. In the invention process the starting Decalin used is one containing at least 10% by weight, preferably at least 50% by weight, and still more preferably at least 70% by weight, of the cis form.

According to the invention process, first, the cis-Decalin and ethylene are submitted to a catalytic alkylation reaction in the presence of a Friedel-Crafts catalyst at a temperature ranging from −50° to 50° C., preferably −20° to 45° C., and still more preferably 0° to 45° C. Usually the reaction is carried out in the substantial absence of water and molecular oxygen.

The presence in the starting ethylene of other olefins in a substantial amount is not desirable, since the purity of the intended product is lessened. However, the presence of other olefins in an amount of the order of less than 5 mol percent is usually permissible. The presence of paraffins in an amount up to about 20 mol percent is permitted.

As the catalyst, those known as the Friedel-Crafts catalysts can be used. For example, usable are the metal halides, particularly aluminum chloride, aluminum bromide, boron trifluoride and antimony pentachloride, and such catalysts consisting of these and hydrogen halides such, for example, as hydrogen chloride and hydrogen fluoride.

These Friedel-Crafts catalysts are used at the rate usually of 0.1–50 mol percent, and preferably 1–20 mol percent, based on the cis-Decalin.

In the foregoing catalytic alkylation reaction, first, 9-ethyldecalin and the isomers thereof are formed. Now, if the temperature is raised to above 50° C. or the reaction time is prolonged excessively in order to raise the conversion of the Decalin, the ethyldecalin formed isomerizes to form a substantial amount of dimethyldecalin in this first step. Since this dimethyldecalin is more readily ethylated than the starting cis-Decalin, the once formed desired dimethyldecalin becomes transformed into undesirable high boiling fractions. In consequence, so long as ethylene is present, it was found that dimethyldecalin could not be obtained in good yield. Hence, in the invention process the catalytic alkylation reaction is terminated at an appropriate time, and an isomerization reaction is carried out in the absence of ethylene at a temperature ranging from −20° to 80° C.

The time in which to terminate the aforesaid catalytic alkylation reaction and transfer to the isomerization reaction can be determined in a number of ways. For instance, when the catalytic alkylation reaction is carried out by the batch method, the reaction is carried out charging, based on one mol of the starting cis-Decalin, not more than one mol, usually 0.1–1 mol, and preferably 0.2–0.9 mol of ethylene. On the other hand, when, for example, the foregoing catalytic alkylation reaction is carried out while introducing the ethylene continuously to the reaction system, the reaction product is sampled and detected for the amount of the unreacted cis-Decalin. When the amount of the unreacted cis-Decalin becomes an amount less than the 50% by weight of the cis-Decalin fed, i.e., for instance, when the amount comes within the range of 1–50% by weight, and preferably 5–40% by weight, the transfer to the isomerization reaction is advisable. Again, it is also possible to carry out, for example, a preliminary experiment under predetermined conditions and thus establish the reaction time to be used.

In the invention process, the reaction product obtained in the catalytic alkylation reaction is submitted, as hereinbefore noted, to an isomerization reaction in the absence of ethylene at a temperature of −20° C. to 80° C. A higher temperature can be employed, but since the isomerization reaction proceeds too fast or an increase takes place in the high boiling by-products, the reaction is best carried out at a temperature of the order indicated. Now, if the catalytic alkylation reaction is terminated and a shift to the isomerization reaction is made at the time the amount of the unreacted cis-Decalin is still quite large, the unreacted cis-Decalin contained in the reaction product isomerizes to the trans-Decalin by the isomerization reaction. Hence, for preventing the loss of the starting material, it is advisable to add a distillation step and separate the unreacted cis-Decalin before shifting to the isomerization reaction. The recovered cis-Decalin can be reutilized as the starting material.

Since the Friedel-Crafts catalyst used in the aforesaid catalytic alkylation reaction can be used as the isomerization catalyst, the catalytic alkylation reaction product from which ethylene has been removed can be submitted in situ to the isomerization reaction. If desired, the reaction can be carried out after adding an additional amount of the same Friedel-Crafts catalyst. Or, if desired, a Friedel-Crafts catalyst other than that used in the catalytic alkylation reaction can be used as an additional catalyst. Alternatively, the isomerization reaction can be carried out after substitution of these other Friedel-Crafts catalysts for the catalyst used in the catalytic alkylation reaction.

The isomerization reaction is carried out in the absence of ethylene. The ethylene remaining in the reaction zone can be purged with a gas which is inert to the isomerization reaction such, for example, as nitrogen, hydrogen, methane and ethane. Or the ethylene can be removed under reduced pressure and the reaction be carried out under reduced pressure.

This isomerization reaction is carried out at −20° to 80° C., preferably 0° to 70° C., and especially from room temperature to 60° C. No particular restriction is imposed as to the period of time the isomerization reaction is to be carried out in the absence of ethylene, but usually employed is a period of time in the range of the order of 1–10 hours. The isomerization reaction is preferably carried out at a temperature higher than the aforesaid catalytic alkylation reaction.

While the catalytic alkylation reaction and the subsequent isomerization reaction in the invention process are both usually operated at normal atmospheric pressure, either superatmospheric or reduced pressure can also be employed, if desired.

When water is added to the reaction product after the completion of the reaction to deactivate the catalyst, the product system separates into an aqueous phase containing a decomposed product of the catalyst and a phase containing the intended product. Thus, the upper layer containing the intended product can be collected and cooled at a temperature below −50° C., e.g. of the order of −50° C. to −80° C., to crystallize out the intended dimethyldecalin, e.g., 2,6-dimethyldecalin. The crystalline product can be separated and collected by any of the known liquid-solid separation methods. When the concentration of the dimethyldecalin in the product is extremely low, the product can be distilled to separate and recover the unreacted Decalin, following which the residuum can be fractionated to obtain a 215–240° C. fraction dimethyldecalin isomer, and thereafter the intended product can be crystallized by cooling and then, separated and collected by operating as described above. The resulting 2,6-dimethyldecalin can be purified by recrystallizing it from, say, methanol.

As compared with the prior art in which cyclohexane is dimerized, in the invention process a much less expensive and readily available Decalin obtained by the hydrogenation of naphthalene is used as the starting material, and the intended dimethyldecalins are obtained at vastly superior rates of selectivity and yield.

The following examples and control experiments are given for illustrating several modes of operating the invention process.

EXAMPLE I

A 500 cc. 3-necked flask was charged with 192 grams of Decalin containing 18% by weight of the cis form and 15 grams of aluminum chloride purified by sublimation in the presence of hydrogen chloride. The ethylation reaction was then carried out by blowing in dried ethylene at 30° C. with stirring.

Five hours after the start of the reaction, the reaction mixture was analyzed by means of gas chromatography with the results shown in Table 1.

TABLE 1
[Percent]

| Composition of reaction mixture | | | | ED isomer composition | |
|---|---|---|---|---|---|
| Decalin | ED isomers | High boiling fraction | ED yield | ED | DMD |
| 82.8 | 15.5 | 1.7 | 90.2 | 98.7 | 1.3 |

Note.—ED stands for ethyldecalin and DMD stands for dimethyldecalin. These abbreviations are to be equally applicable hereinafter.

After the introduction of the ethylene to this reaction system was stopped, moisture-removed dry nitrogen was blown in to purge the unreacted ethylene externally of the reaction system. This was followed by raising the reaction temperature to 50° C. and continuing the reaction for a further 7 hours with stirring to carry out the isomerization of the ethyldecalin. On analysis by means of gas chromatography, the results shown in Table 2, below, were obtained.

TABLE 2
[Percent]

| Composition of reaction mixture | | | | ED isomer composition | |
|---|---|---|---|---|---|
| Decalin | ED isomers | High boiling fractions | Yield of ED isomers | ED | DMD |
| 81.8 | 15.7 | 2.5 | 86.3 | 4.5 | 95.5 |

EXAMPLE II

A 500 cc. 3-necked flask was charged with 207 grams of Decalin containing 98% by weight of the cis form and 30 grams of aluminum chloride purified by sublimation in hydrogen chloride gas. The reaction was then carried out for 16 hours by introducing dried ethylene at 18° C. with stirring. After separating this reaction product from the catalyst layer, it was water-washed and thoroughly dried, after which it was analyzed by means of gas chromatography. The results obtained are shown in the following Table 3.

TABLE 3
[Percent]

| Composition of reaction mixture | | | | ED isomer composition | |
|---|---|---|---|---|---|
| Decalin | ED isomers | High boiling fractions | Yield of ED isomers | ED | DMD |
| 47.8 | 48.8 | 3.4 | 93.5 | 98.4 | 1.6 |

This reaction mixture was distilled to obtain an ethyldecalin isomer fraction, which was then introduced to a vessel containing the foregoing catalyst, following which the isomerization of the isomer was carried out by conducting the reaction for 8 hours with stirring after raising the temperature to 45° C. This reaction mixture was separated, water-washed and thereafter analyzed by gas chromatography.

The results of the analysis are shown in Table 4, below.

TABLE 4
[Percent]

| Composition of reaction mixture | | | | ED isomer composition | |
|---|---|---|---|---|---|
| Decalin | ED isomers | High boiling fractions | Yield of ED isomers | ED | DMD |
| 1.0 | 98.6 | 0.4 | 98.6 | 2.1 | 97.9 |

When this reaction mixture was cooled to −70° C., crystals separated out. This was then cold filtered to isolate 2,6-dimethyldecalin.

The yield of the isolated product was about 13% by weight of the reaction mixture. This product was further submitted to recrystallization with a small quantity of methanol to obtain 10% by weight of 2,6-dimethyldecalin of 95% purity.

EXAMPLES III–IV AND CONTROLS I–IV

Experiments were carried out by operating as in Example I, except that the starting Decalins used were those containing the cis form in varied amounts, the Friedel-Crafts catalysts used were varied, and the conditions employed in conducting the catalytic ethylation and isomerization reactions were varied.

The results obtained are shown in Table 5, below.

TABLE 5

| Number | Starting Decalin Cis form content (mol percent) | Starting Decalin Amount used (g.) | Catalyst Class | Catalyst Amount used (g.) | Ethylation reaction Temperature (° C.) | Ethylation reaction Time (hr.) | Ethylation reaction Product $C_{12}$ | Ethylation reaction Mol percent H.E.[1] | Ethylation reaction $C_{12}$ selectivity [2] | Isomerization reaction Temperature (° C.) | Isomerization reaction Time (hr.) | Isomerization reaction DMD Yield [3] | Isomerization reaction DMD Selectivity [4] | Isomerization reaction H.E.[1] yield |
|---|---|---|---|---|---|---|---|---|---|---|---|---|---|---|
| Example: | | | | | | | | | | | | | | |
| III | 32 | 140 | $AlCl_3$ | 40 | 0 | 7 | 10.8 | 2.0 | 84.5 | 10 | 20 | 10.7 | 80.0 | 2.2 |
| IV | 32 | 140 | $AlCl_3$ | 27 | 25 | 3 | 23.9 | 4.6 | 84.0 | 55 | 6 | 23.5 | 81.4 | 4.8 |
| V | 35 | 210 | $AlCl_3$ | 27 | 40 | 3 | 28.0 | 6.3 | 81.5 | 55 | 6 | 28.0 | 80.7 | 6.4 |
| Control: | | | | | | | | | | | | | | |
| I | 35 | 210 | $AlCl_3$ | 27 | 55 | 3 | 23.3 | 17.2 | 58.0 | 55 | 6 | 23.0 | 56.2 | 17.5 |
| II | 35 | 210 | $AlCl_3$ | 27 | 60 | 3 | 22.5 | 19.8 | 53.0 | 60 | 6 | 22.3 | 51.3 | 19.9 |
| Example VI | 10 | 280 | $AlBr_3$ | 30 | 30 | 5 | 8.0 | 1.5 | 84.2 | 55 | 10 | 7.9 | 81.5 | 1.6 |
| Control: | | | | | | | | | | | | | | |
| III [5] | 10 | 280 | $AlBr_3$ | 30 | 30 | 5 | 8.1 | 1.5 | 84.5 | 55 | 10 | 3.9 | 37.1 | [5] 6.5 |
| IV | 0 | 100 | $AlBr_3$ | 20 | 30 | 5 | 0.3 | 0.5 | 37.5 | | | | | |

[1] H.E. denotes heavy end, the calculation being made on the assumption that it is a $C_{14}$ compound.

[2] $\frac{C_{12} \text{ compound}}{\text{Reacted Decalin}} \times 100$

[3] $\frac{DMD}{\text{Reaction mixture}} \times 100$

[4] $\frac{DMD}{\text{Reacted Decalin}} \times 100$

[5] An instance where the isomerization reaction was carried out while introducing ethylene.

EXAMPLE VII

A 500 ml. 3-necked flask was charged with 138 grams of Decalin containing 95% of the cis form and 10 grams of aluminum chloride purified by sublimation. The reaction was then carried out for 20 hours at 20° C. by blowing in dried ethylene with stirring. After separating the reaction product from the catalyst layer, it was water-washed, dried and distilled to obtain 65 grams of an ethyldecalin fraction. This fraction was placed in a stainless steel 500 ml. autoclave and, after the autoclave was closed, the reaction was carried out for 6 hours at 70° C. in a closed system by introducing 100 ml. of liquid hydrogen fluoride (HF) and 5 grams of boron trifluoride via the inlet line. The reaction product was then cooled with a Dry Ice-acetone bath, and the organic layer was separated, neutralized, washed and dried, and thereafter analyzed by means of gas chromatography with the results shown in Table 6.

TABLE 6

Composition of the reaction product percent:
| | |
|---|---|
| Decalin | 1.2 |
| ED | 2.0 |
| DMD | 96.3 |
| H.E. | 0.5 |

We claim:

1. In the process for the preparation of dimethyldecalins by catalytically reacting Decalin with ethylene in the presence of a Friedel-Crafts catalyst, the improvement which comprises operating the process in two steps:
   (a) A catalytic alkylation reaction of cis-Decalin with ethylene at a temperature ranging between −50° and 50° C., and subsequently
   (b) An isomerization reaction of the resulting product system at a temperature ranging between −20° and 80° C. in the presence of a Friedel-Crafts catalyst but absence of ethylene.

2. The process according to claim 1 wherein said catalytic alkylation reaction of (a) is carried out at a temperature ranging between −20° and 45° C., and said isomerization reaction of (b) is carried out at a temperature ranging between 0° and 70° C.

3. The process according to claim 1 wherein said Friedel-Crafts catalyst is used in an amount of 0.1–50 mol percent based on the cis-Decalin.

4. The process according to claim 1 wherein said isomerization reaction is carried out at the point the unreacted cis-Decalin contained in the reaction product has become 1–50% by weight of the amount of the initially fed cis-Decalin.

5. The process according to claim 1 wherein said Friedel-Crafts catalyst is a member selected from the group consisting of aluminum chloride, aluminum bromide, boron trifluoride, antimony pentachloride and a combination thereof with a hydrogen halide.

References Cited

UNITED STATES PATENTS

| | | | |
|---|---|---|---|
| 2,428,923 | 10/1947 | Thomas et al. | 260—666 Py |
| 3,256,353 | 6/1966 | Shumau, Jr. et al. | 260—666 Py |
| 3,346,656 | 10/1967 | Schneider | 20—666 Py |
| 3,509,223 | 4/1970 | Bushick et al. | 260—666 Py |

OTHER REFERENCES

J. R., Dice et al.: J. Amer. Chem. Soc., vol. 72, pp. 1403–4, 1950.

DELBERT E. GANTZ, Primary Examiner

V. O'KEEFE, Assistant Examiner